United States Patent [19]

Spaziante et al.

[11] 4,073,707

[45] Feb. 14, 1978

[54] METHOD OF OPERATING A CIRCULATING BED CELL

[75] Inventors: Placido Maria Spaziante; Rinaldo Santi, both of Milan, Italy; Vittorio De Nora, Nassau, Bahamas

[73] Assignee: Parel Societe Anonyme, Luxembourg

[21] Appl. No.: 753,228

[22] Filed: Dec. 22, 1976

[51] Int. Cl.$^2$ .......................... C25C 1/00; C25C 1/12
[52] U.S. Cl. ................. 204/105 R; 204/222; 204/108
[58] Field of Search ............... 204/105 R, 222, 108

[56] References Cited

U.S. PATENT DOCUMENTS

| | | | |
|---|---|---|---|
| 3,180,810 | 4/1965 | Pearce et al. | 204/238 |
| 3,527,617 | 9/1970 | Prober | 429/15 |
| 3,551,207 | 12/1970 | Herbst | 429/14 |
| 3,974,049 | 8/1976 | James et al. | 204/222 |

*Primary Examiner*—R. L. Andrews
*Attorney, Agent, or Firm*—Armstrong, Nikaido & Marmelstein

[57] ABSTRACT

The invention discloses a method of controlling the size distribution of electroconductive particles constituting a particulate electrode in an electrochemical cell. Particles are extracted from the particulate electrode and are subjected to elutriation, the flow of elutriating fluid being such that particles larger than a predetermined size settle against the flow of fluid, while the other particles are carried along by the elutriating fluid and are eventually returned to the electrochemical cell.

19 Claims, 11 Drawing Figures

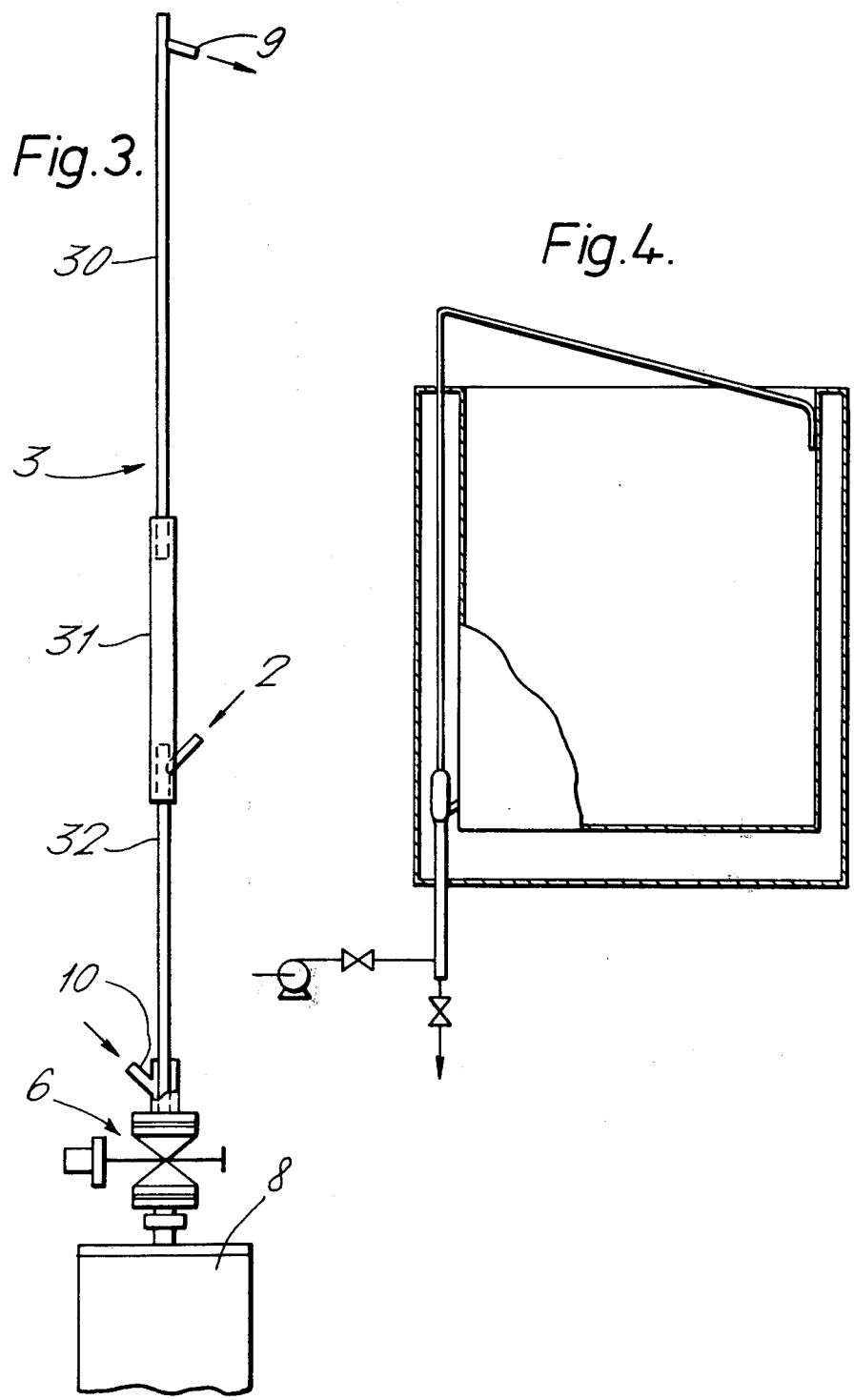

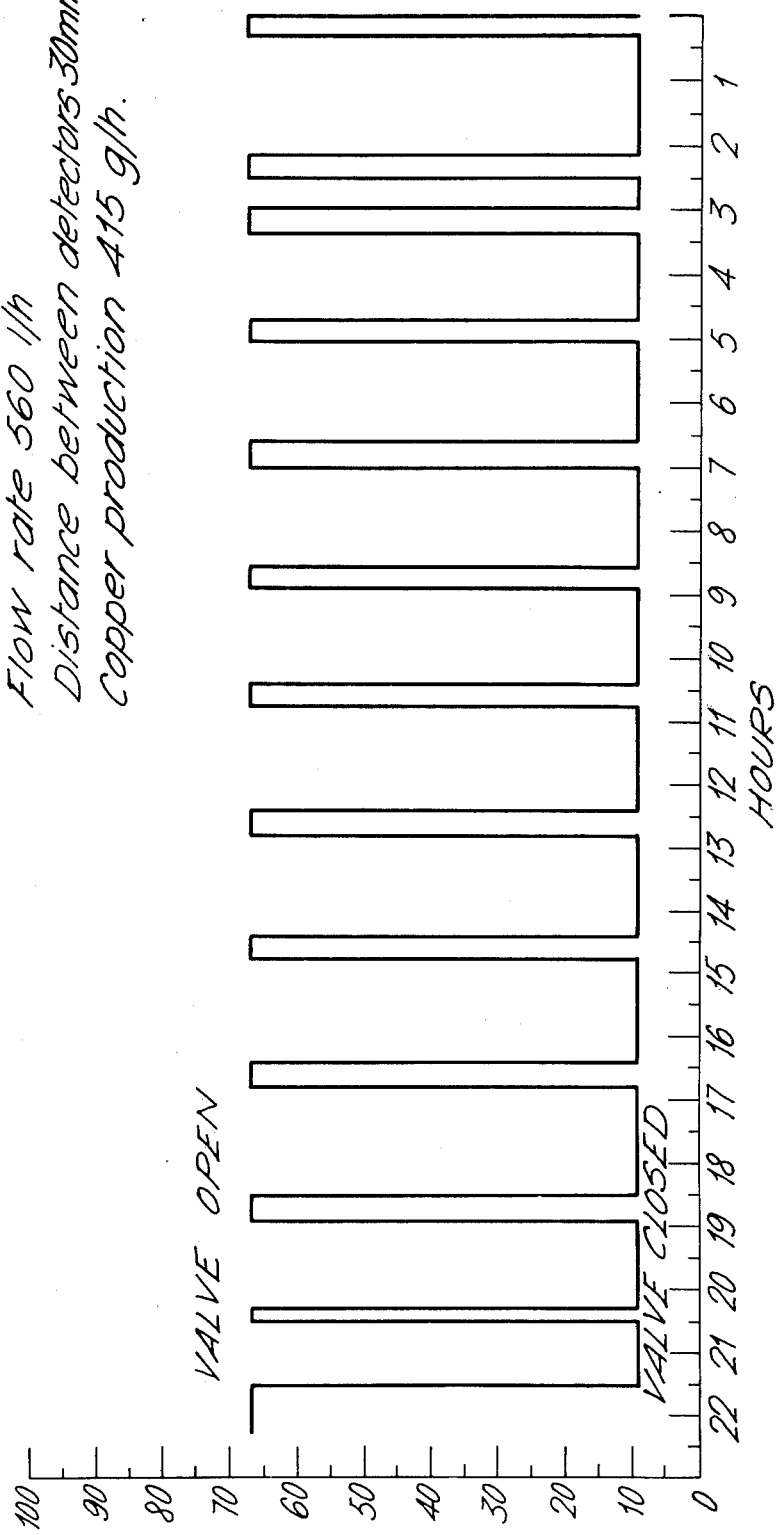

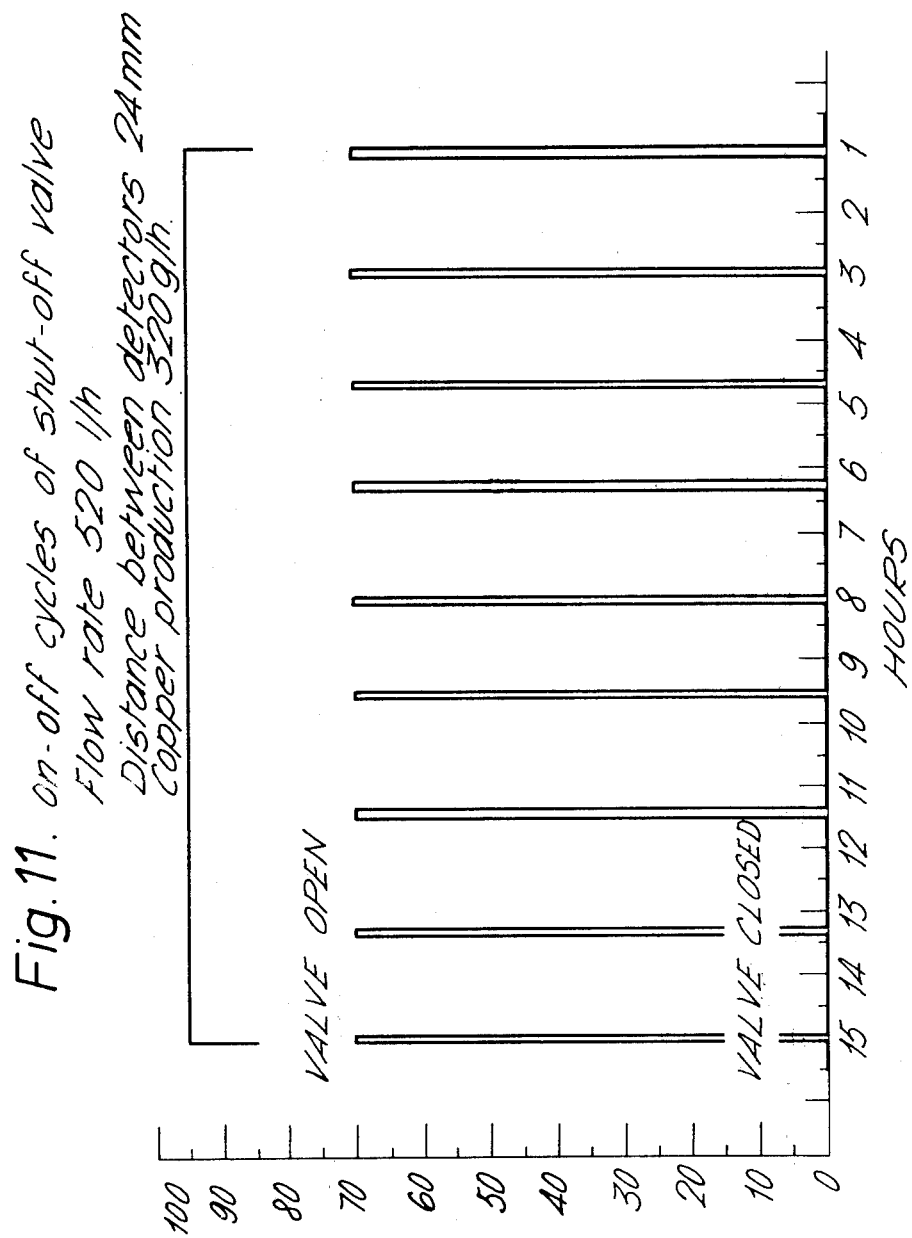
Fig. 11. on-off cycles of shut-off valve
Flow rate 520 l/h
Distance between detectors 24mm
Copper production 320 g/h

METHOD OF OPERATING A CIRCULATING BED CELL

This invention relates to electrochemical cells and to processes carried out in these cells, and more particularly is concerned with such cells and processes which involve the use of fluidised bed or circulating bed electrodes.

In recent years there have been described particulate electrodes which comprise a number of particles at least the surfaces of which have an electrical conductivity of the order of $10^2 \Omega^{-1} cm^{-1}$ or greater and which, when the particulate electrode is in use, are moving so as to be in intermittent contact, either directly or through the agency of intermediate particles, with at least one electrically-conductive member often called the "feeder electrode" by means of which electric current is conducted to the particles which engage in charge transfer reactions with species contained in the electrolyte. The electrical conductivity of the "feeder electrode" is generally of the order of $10^4 \Omega^{-1} cm-1$ or greater. These particulate electrodes have been developed in a number of different forms. In one form, a mixture of the particles of the electrode and an electrolyte is pumped through a portion of the cell which contains the feeder electrode and in which the electrode reaction occurs, around a circuit outside this portion and is then returned to the portion for further reaction. In another form, the particles of the electrode remain continuously within the portion of the cell which contains the feeder electrode for the entire length of time during which the particles are allowed to contribute to the electrode reaction, whilst the electrolyte is passed through this portion so as to intermix the particles of the electrode. Often included within this latter form are electrodes which, in operation, comprise an expanded bed of particles formed by an upward flow of electrolyte through the portion of the cell which contains the particles of the electrode. With sufficiently fast flow rates the particles become suspended in the electrolyte and the bed becomes expanded in volume usually by expansion in the vertical direction. The terminology of "fluidised beds" has been applied to this situation and many of the properties of fluidised beds are evident in the behaviour of these electrodes which are therefore frequently known as "fluidised bed electrodes." The high surface area of a fluidised bed electrode makes possible either the efficient electrolysis of dilute solutions or the use of a high current per unit volume of cell and per unit volume of electrolyte; for example, in copper deposition, apparent current densities up to 3000 A/m² and more have been used.

Examples of particulate electrodes including fluidised bed electrodes, and their use in various electrochemical processes are disclosed in, for example, British Patent No. 1,194,181; U.S. Pat. No. 3,180,810, U.S. Pat. No. 3,527,617; U.S. Pat. No. 3,551,207; French Patent No. 1,500,269 and Canadian Patent No. 790,933.

Our copending British Patent Application No. 34077/74 describes and claims an electrochemical process in which there is used an electrode formed of discrete, electroconductive particles located in a cell or a compartment of a cell, wherein a fluid is supplied to said cell or compartment so as to cause the majority of said particles to undergo systematic circulatory movement within said cell or compartment.

Particulate electrodes are particularly valuable in electrowinning of metals and other metal electro-deposition processes. In most such processes, metal is deposited on to the particles of a particulate cathode; the particle dimensions increase, and the volume occupied by the bed of particles also increases. These changes are undesirable for continuous, efficient operation of an electrochemical process employing a fluidised bed electrode. In order to maintain constant both the mean particle diameter and the bed volume of the particulate electrode, it is necessary for all of the particles of the particulate electrode to be subjected to a particle size classification process whereby those particles which are larger than a predetermined size are removed, the remaining particles being returned to the electrochemical cell together with a quantity of small particles added to compensate for the removal of oversized particles. The particles removed during the classification process are in effect the product of the electrodeposition process, and will be referred to hereinafter.

Various methods are known for controlling the size distribution of particles in a fluidised bed or circulating bed electrode. in order to effect control of the size distribution of the particles, it is necessary to extract the particles from the bed in the electrochemical cell. In theory, this may be done on a continuous or on a batch basis. In practice, the former is preferred because the latter would result in disturbance of the operating conditions within the bed electrode.

One known method for controlling the size distribution of particles in a fluidised bed electrode is to place samples of the particles on a screen the apertures of which are sufficiently large to pass those particles which are to be returned to the electrochemical cell, but which retain the product particles. With this method, it is difficult to induce the particles to pass through the screen apertures and to maintain a steady transport of the product particles across the surface of the screen for collection at a suitable position. A further problem is that the apertures of the screen may become clogged with product particles.

According to the present invention, there is provided a method of controlling the size distribution of electroconductive particles constituting a particulate electrode in an electrochemical cell, which method comprises extracting particles from the particulate electrode and subjecting the extracted particles to elutriation, the flow rate of elutriating fluid being such that particles larger than a predetermined size are able to settle against the flow of elutriating fluid, while the other particles, which are to be returned to the electrochemical cell, are carried along by the flow of elutriating fluid and are then returned to the electrochemical cell after separation, if necessary, from the elutriating fluid.

In preferred embodiments of the present invention, an elutriation column is in communication (preferably permanently open communication) with the bed of particles and extraction of particles from the cell is governed by controlling the discharge of particles from the base of the elutriation column. This is preferably effected by sensing continuously the height of the bed electrode in the electrochemical cell by means of an electronic circuit or magnetic detector positioned so that its electronic or magnetic characteristics are affected by the electroconductive bed particles; extraction of the particles is initiated when the electronic or magnetic characteristics of the said circuit are of a first, predetermined type indicative of a predetermined maximum height of the bed electrode within the electrochemical cell. Termination of the extraction process is effected subsequently. In one embodiment of the invention, the extraction process is terminated when the electronic characteristics of the said circuit are of a second, predetermined type indicative of a predetermined minimum height of the bed electrode within the electrochemical cell. Alternatively, but less advantageously, the termination of the extraction process may occur a predetermined length of time after its initiation.

Particles suspended in a fluid whose density is lower than their own fall with an acceleration due to the force of gravity until they reach a steady speed, generally called their terminal velocity, at which the downward acting force of gravity is exactly balanced by the upward forces of buoyancy and resistance to flow against the fluid. The terminal velocity is directly proportional to the difference in density between the particle and the fluid in which it is moving, and also directly proportional to the square of the radius of the particle. Under ideal conditions, therefore, with constant density of solid particles and constant viscosity of the elutriating fluid, it is the relative diameter of two particles which determines their relative rate or fall through the fluid. Conditions deviate from the ideal if particles other than spherical particles are involved. In elutriation, any particle of which the free-falling terminal velocity is greater than the velocity of the elutriating fluid will descend against the flow of fluid, while the other particles will remain substantially still or be carried along upwardly with the flow of fluid.

The elutriating fluid will generally be a liquid, and can advantageously be the electrolyte which is in use in the electrochemical cell or in that part of the cell containing the particulate electrode. Where this is the case, no separation of particles from elutriating fluid is required before the particles are returned to the cell. The vessel in which the elutriation step is carried out can be a vertically disposed column which is fed at its base with electrolyte. The particles are preferably introduced into the column or other elutriation vessel at a distance above the point at which the elutriating fluid is supplied. This ensures that the incoming particles are subject to a minimum of turbulence which would tend to disturb the separating effect occurring in the column, and would result in a relatively large variation in size of particles removed from the electrochemical cell.

The extraction of particles from the particulate electrode may be continuous.

The dimensions of the elutriation column can vary over fairly broad ranges, the optimum values in any given case depending inter alia on the nature and dimensions of the electrochemical cell with which the column is associated and the nature of the electrochemical reaction occurring within the cell. In general, it is preferred for the diameter of the column to be sufficiently small for the ratio of flow rate through the column to the flow rate through the particulate electrode to be less than 1:10. Typically, the elutriation column will have a height of from about 1 to about 4 meters and a diameter of from about 15 to about 40 mm. With such a column, it is preferred that the inlet to the column for the particles is at least 0.3 meters above the point at which the elutriating fluid enters the column. It is also preferred for the particles to enter the elutriation column at an angle of inclination with the horizontal of at least 30°. The diameter of the particle inlet to the elutriation column will depend upon the size range of particles constituting the particulate electrode. In general, a particle inlet diameter of about 15 mm should be satisfactory. The particles are preferably supplied to the column from a region of turbulence within the electrochemical cell so as to ensure that a representative selection of particles is continuously supplied to the column. The pressure gradient from the cell to the particle inlet in the column is preferably small, the pressure in the cell preferably being marginally greater.

The diameter of the elutriation column is a significant factor, since it affects the ratio of mean flow velocity within the column to the flow velocity along the central axis of the column, as well as influencing the volumetric concentration of particles within the column. In order to prevent hindered settling, this volumetric concentration of particles is preferably less than about 1%, and more preferably less than 0.1%.

Because an increased volume of material must flow through the elutriation column above the point at which particles enter the column, it may be advantageous for the column diameter at and above the particle inlet to be greater than that in the lower portion of the column. Such an arrangement helps to ensure that particles have a constant terminal velocity throughout the length of the column.

The preferred embodiments of the invention makes use of the variation in bed volume (which in practice is equivalent to variation in bed height, because of the constraints upon expansion of the bed caused by the walls of the electrochemical cell) to initiate an extraction process for particles which are to undergo particle classification. Advantageously, the electronic circuit is an LC oscillator circuit. The electronic characteristics used, in this case, as indicative of the height of the bed electrode are the resonance characteristics of the circuit. The inductance and capacitance of the circuit can be adjusted so that the presence of electroconductive particles within the field generated by the oscillator circuit affect a given circuit characteristic, damping or frequency of the oscillations. Thus the device can be used to give a signal whenever the circuit characteristics are of a predetermined type or value. Such a signal can be used to control a mechanical device for admitting particles to or removing particles from the elutriation column, or for permitting particles to pass out of the electrochemical cell.

Advantageously, two fixed LC oscillator circuits are employed, one at a position corresponding to a predetermined maximum height of the bed electrode, and the other at a position corresponding to a predetermined minimum height of the bed electrode. In this way, the onset of damping of the resonance of the first LC oscillator circuit is used to initiate the extraction of particles from the electrode bed, and the onset of damping of the oscillations of the second LC oscillator circuit is used to terminate the extraction process.

Magnetic detectors may be used in place of electronic detectors when the electroconductive particles are ferromagnetic, e.g. with iron, nickel or cobalt particles.

Suitable electronic circuits are commercially available and suitable types are known as proximity detectors, electronic styli, inductive styli, and inductive proximity switches. These are generally a switch in the form of an electronic probe which is operated by modification of the resonance characteristics of its LC oscillator circuit when the device is placed in the vicinity of electroconductive material. The operation of the switch depends upon the particular circuit values adopted, the type of metal placed in the vicinity of the device and also, to some extent, the temperature of operation. Commercially available switches are normally rated according to the maximum separation between the device and a metal (usually iron) which will result in the operation of the switch. The usually rated distances are 1, 2, 5, 10, 20 and 50 mm, based on iron. Where a metal other than iron is involved, it is necessary to apply a correction factor to the rate distance in order to achieve satisfactory operation of the switch. The correction factors depend upon the particular detector being used; in general, the correction factors for several metals approximate to the values given below:

Fe = 1
NiCr = 0.85
Brass = 0.54
Al = 0.5
Cu = 0.46

The dimensions of the electronic probe can vary considerably; for a cylindrical probe, the diameter will normally lie within the range from 15 to 35 mm, and its length will normally be from 26 to 90 mm.

The or each electronic circuit is preferably housed in a probe which can conveniently be installed on or adjacent to a wall of the electrochemical cell which wall forms a boundary for the electrode bed. In an electrochemical cell such as described and claimed in any of our copending British Patent Applications Nos. 34077/74, 49184/74 or 1014/74, the electronic probe can conveniently be installed on the back plate of the cathode compartment. In a bipolar stack, the probe can be installed on the side frame.

Where two electronic probes are employed at positions corresponding to the predetermined maximum and minimum heights of the bed electrode, the two probes are preferably separated by a distance greater than about 25 mm. This prevents unduly rapid switching as a result of temporary fluctuations in the bed level. Two additional probes may be employed as alarms to indicate when the bed level is higher or is lower than the predetermined maximum and minimum values, respectively.

Preferably, the elutriation of the extracted particles is controlled automatically to ensure that the total volume of particles constituting the particulate electrode in the electrochemical cell remains substantially constant. This is achieved in the preferred embodiments of the invention described above; an alternative procedure involves monitoring the pressure at the base of that part of the electrochemical cell containing the particulate electrode, and modifying the operation of the elutriation system in accordance with the pressure values prevailing at any one time. A pressure control system can be employed which modifies the flow rate of elutriating fluid supplied to the column, or which controls the rate at which oversized particles are let out from the elutriation system.

We have found that, under steady operating conditions, the flow rate of ascending fluid is proportional to the diameter of the elutriation column and to the diameter of the product particles which fall to the base of the column. This relationship may be represented by the following equation:

$$Q = KD_I^2 d_p$$

where $D_I$ is the inside diameter of the column, $d_p$ is the diameter of the product particles ejected from the base of the column and K is an empirical constant. If $D_I$ and $d_p$ have dimensions in millimeters, and the flow rate Q is in liters per hour, we have found that the value of the constant K ranges from about 0.5 to 5.

The method of this invention may be used inter alia in conjunction with the electrochemical processes described and claimed in our copending British Patent Applications Nos. 24077/74, 31524/74, 34076/74, 34077/74, 49184/74 and 1014/75.

For a better understanding of the invention, and to show how the same may be carried into effect, reference will now be made, by way of example, to the accompanying drawings, in which:

FIGS. 1 and 2 schematically illustrate apparatus in which two embodiments of the method of the invention may be carried out;

FIG. 3 is an enlarged view of part of the apparatus shown in FIG. 1;

FIGS. 4, 5 and 6 show modifications of parts of the apparatus shown in FIGS. 1 and 2;

FIGS. 10 and 11 are graphs illustrating the operation of the method of this invention.

Figure 1:
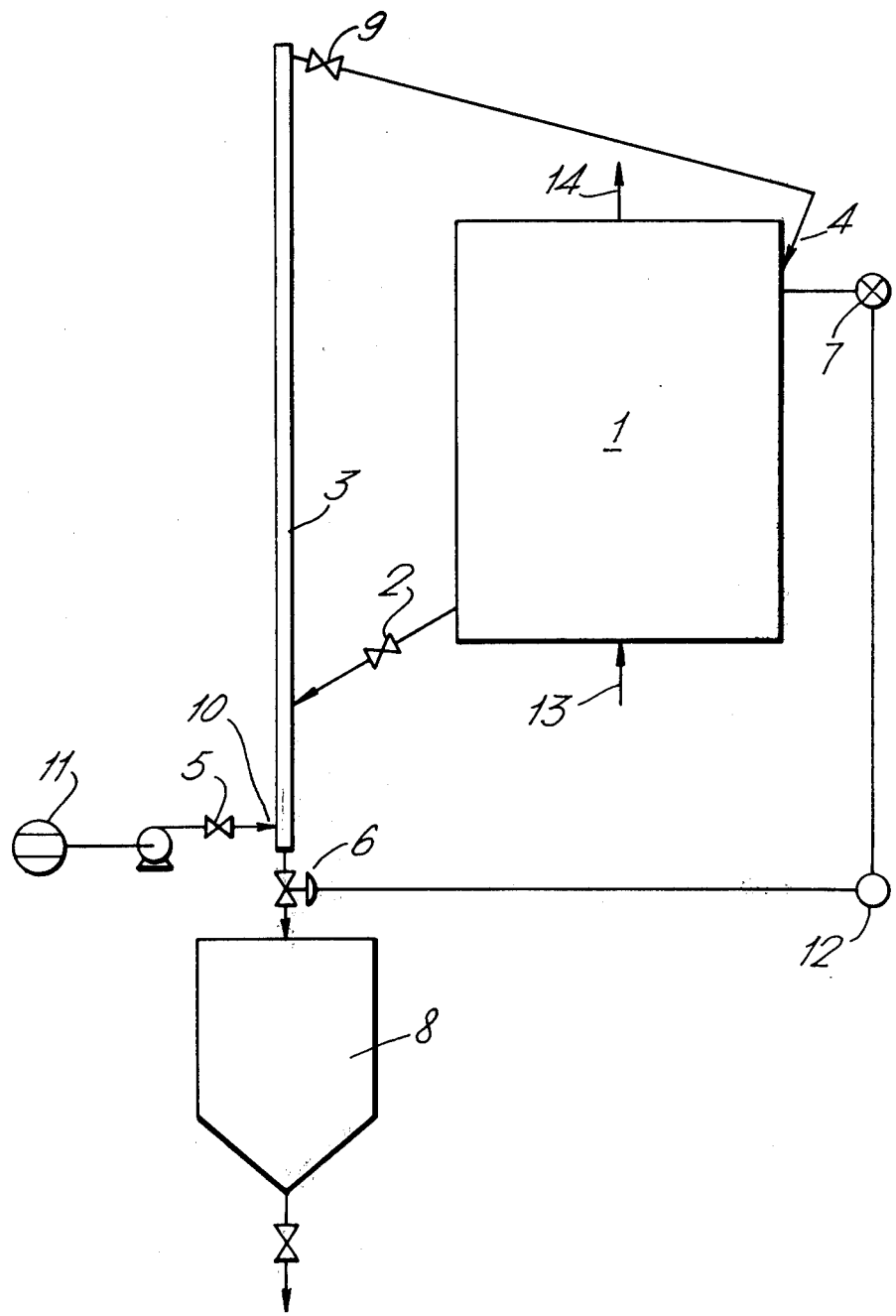
Figure 7:
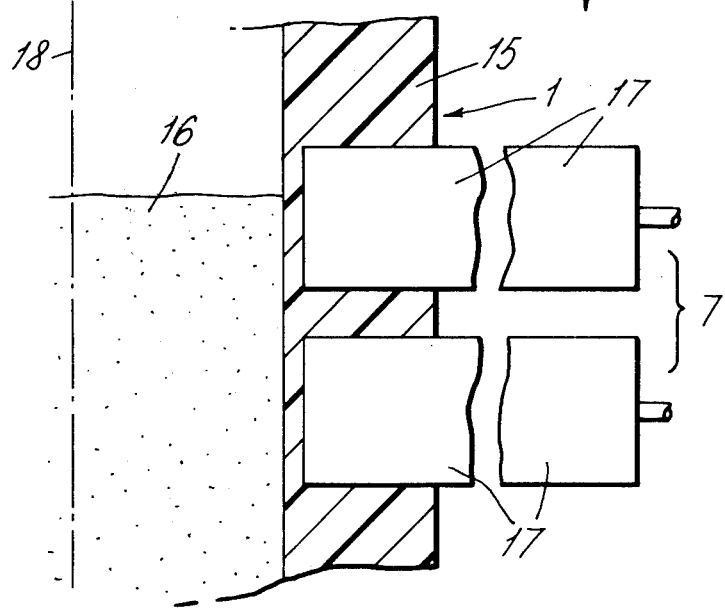
FIG. 7 is a vertical section through part of the apparatus shown in FIG. 1.

Referring first to FIGS. 1 and 7 of the drawings, the cathode compartment of an electrochemical cell used in an electrowinning process is indicated generally at 1. This cathode compartment contains a fluidised bed cathode 16 which is kept fluidised when the electrochemical cell is in operation by flowing electrolyte upwardly through the particulate electrode. This operation is indicated generally by the arrow 13 in FIG. 1. Close to the level of the electrolyte inlet in the lower part of the cathode compartment there is an outlet 2 which supplies a proportion of the particles constituting the particulate cathode from the cathode compartment 1 to an elutriation column 3. The particle outlet 2 is in a region of turbulence within the cathode compartment, thus ensuring that a representative selection of particles is supplied to the elutriation column 3. Catholyte is fed from a tank 11 via a flow rate valve 5 to an inlet 10 in the lowermost part of the column 3. Particles which are carried along with the catholyte in the column 3, that is those particles which have not yet reached the predetermined product size, are returned to the cathode compartment of the electrochemical cell via a head control valve 9 and a return inlet 4. The particle outlet 2 and the particle return inlet 4 are disposed opposite one another in order to avoid any segregation between large and small particles within the cathode compartment of the cell. Product particles pass from the elutriation column 3, via a regulating valve 6, to a tank 8. An electronic control system 7 comprising two inductive proximity detectors which are constructed as electronic probes each of which contains an LC oscillator circuit and effects a switching function when in the vicinity of electroconductive material, acts upon the valve 6 to effect automatic control thereof. The two devices 17 are set into the back plate 15 of the cathode compartment 1. The centres of the devices 17 are 30 mm apart, and the separation between the fluidised bed 16 and the forward edge of the devices 17 is 3 mm. The flow rate of catholyte through valve 5 is kept constant, control of the process being effected via the electronic control system 7. Thus particles from the particulate bed 16 can enter the column 3 at all times; removal of product particles from the base of the column via the valve 6 is controlled in accordance with the height of the bed of particles 16.

The general arrangement described above is the preferred one. It is possible, however, to effect control of the particle classification via a pressure control system 7 and 12 instead of the electronic system just described. The pressure at the base of the cathode compartment 10 depends upon the height and bed expansion of particles constituting the fluidised bed cathode. As these particles grow, the pressure at the base of the compartment increases. The pressure control system 7 and 12 is designed to open automatically the valve 6 when this pressure reaches a predetermined level. As product particles are removed from the column 3, the cell bed level falls and when the pressure at the base of the cathode compartment falls below the predetermined value, the pressure control system closes the valve 6. It has been found desirable to arrange the flow rate of catholyte through valve 5 to be such that the pressure control system keeps the valve 6 open for about 50% of the time.

Means (not shown) are provided for introducing small particles into the fluidised bed electrode to compensate for the withdrawal of product particles. Such added particles may be introduced into the cell at the inlet 4. Automatic control of the addition of these particles may be effected through the electronic control system 7 or the pressure control system 7 and 12.

Figure 2:
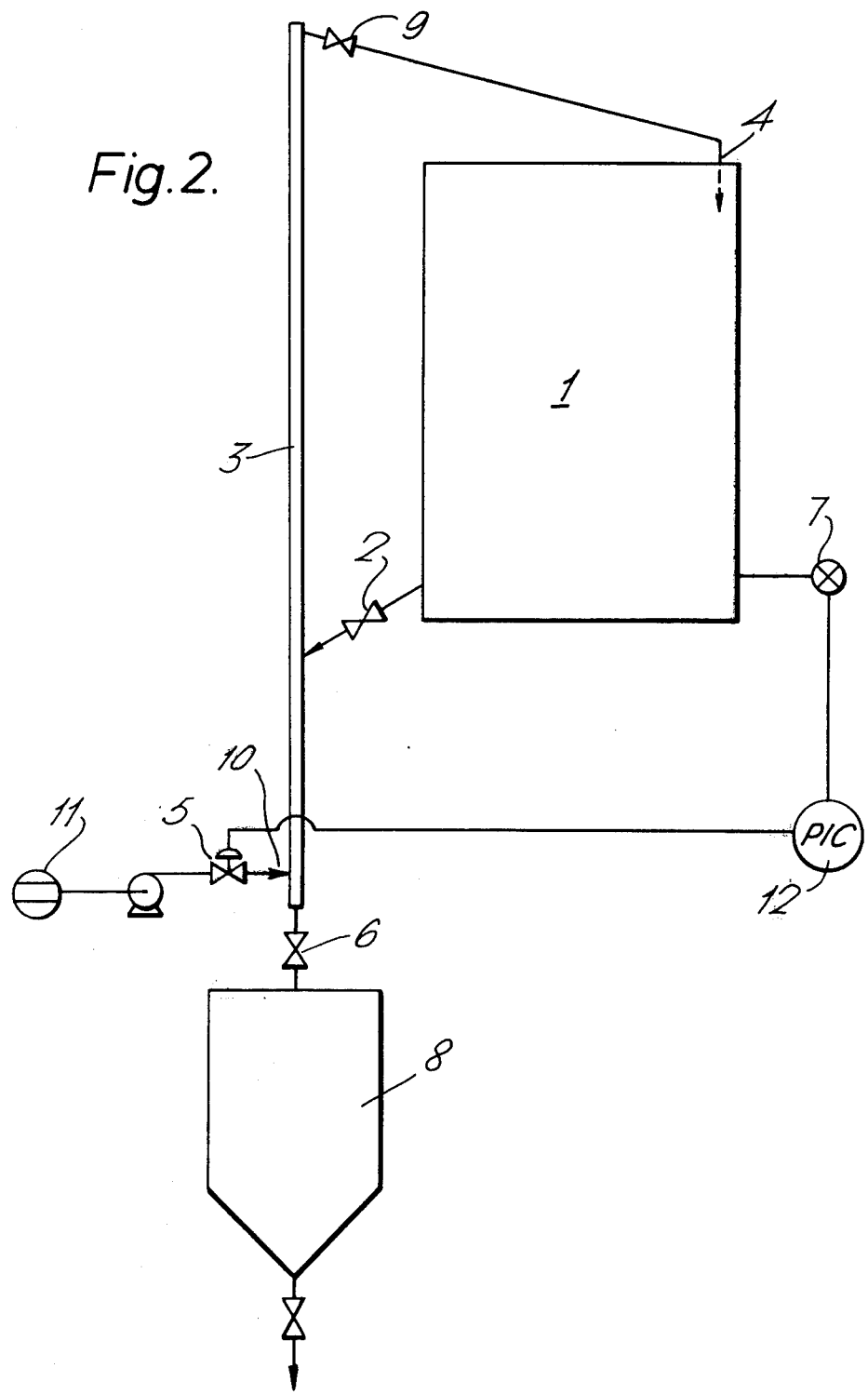

Referring now to FIG. 2, the apparatus is substantially the same as that shown in FIG. 1, but the means for controlling the classification system is different. In this case, pressure control devices 7 and 12 act upon the valve 5 in order to regulate automatically the flow rate of catholyte which is introduced into the elutriation column 3. In addition, the flow of particles and solution from the cell 1 can be regulated by the valve 8 in order to maintain a head difference between the elutriation column 3 and the electrochemical cell 1 which is less than about 50 to 100 mm of mercury. If the pressure difference is higher than this, flow of solution from the cell is very large, and poor separation is obtained due to increased velocity in the column just above the inlet 2. A further adverse effect of the pressure difference being too great is that flow distribution within the electrochemical cell itself is also disturbed.

Referring next to FIG. 3, the elutriation column 3 comprises an upper portion 30, a central section 31 and a lower portion 32. The inside diameters of the upper and lower portions are the same; the inside diameter of the central portion 31 is about 5% larger than that of the other two portions. Particles from the fluidised bed within the cathode compartment 1 are supplied to the lower portion of the central section 31 of the elutriation column at 2.

Figure 8:
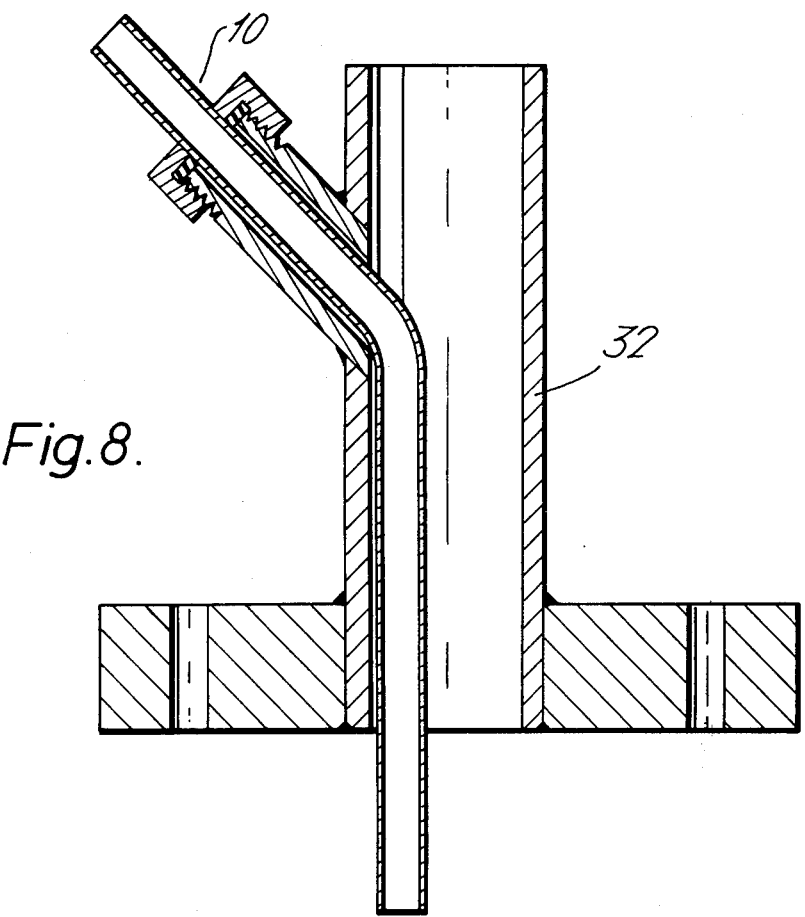
FIG. 8 is an enlarged view of part of the apparatus shown in FIG. 3.

The point at which electrolyte is introduced into the elutriation column is shown in an enlarged view in FIG. 8. A small stainless steel pipe 10 is used to supply the electrolyte to the base of the elutriation column 3, the end of the pipe 10 being close to the valve 6 in order to avoid the sticking together of particles or disrupting the close packing of product particles over the valve.

Figure 9:
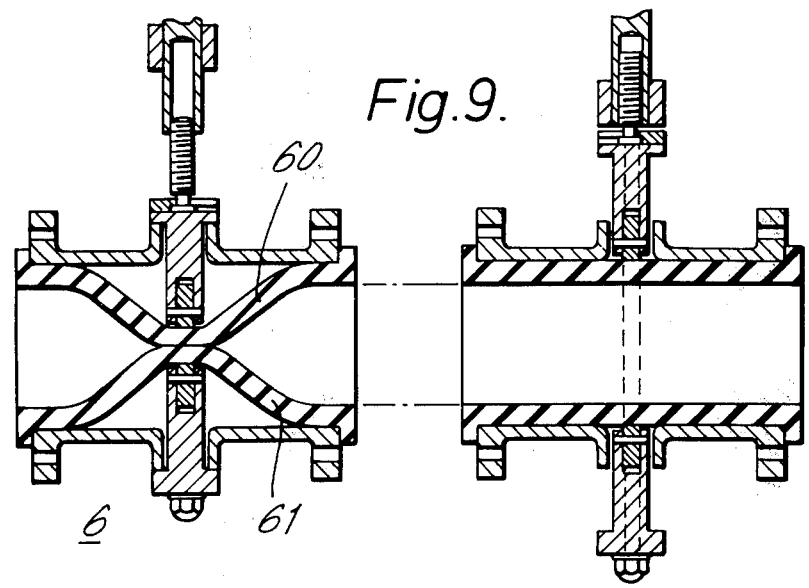
FIG. 9 shows part of the apparatus shown in FIG. 3 in two operational states.

As can be seen more clearly from FIG. 9, the valve 6 is a pinch valve; operation of the valve is controlled by the electronic control system 7 (or the pressure control system 7 and 12) as described above. The valve is shown in the closed and open conditions in FIG. 9. In the open condition, the valve presents a conduit of about 25 mm diameter for the passage of product particles into the hopper 8. In the closed condition, opposite surfaces 60 and 61 of an elastic sleeve are forced together to cut off the flow passage between the elutriation column 3 and the hopper 8.

The material from which the elastic sleeve 60 and 61 is formed is conveniently natural rubber or blends of natural and synthetic rubbers provided that the operating temperatures do not exceed about 60° C. For higher operating temperatures, neoprene rubber, silastik-rubber or other blends of synthetic rubbery polymers may be used. This type of valve has been found to be the most suitable for use with the apparatus illustrated in the drawings.

FIGS. 10 and 11 are graphs showing the operation of the apparatus just described over a period of time. In FIG. 10, the flow rate through the elutriation column 3 was 569 liters per hour, and the particulate bed electrode consisted of particles of copper used as the cathode in a copper electrowinning process. The rate of production of copper (measured by the net weight of particles extracted from the bed 16) amounted to 415 grams per hour. As can be seen from the graph of FIG. 10, the valve 6 was open for about 20 to 25% of the total operating time. In the period of operation illustrated in FIG. 11, the apparatus was used with a flow rate through the elutriation column 3 of 520 liters per hour, and the two devices 17 were positioned with their centres 24 mm apart, rather than 30 mm apart as was the case with the graph shown in FIG. 10. The particulate bed once again consisted of particles of copper, in a copper electrowinning process. The copper production (measured by the net weight of particles extracted from the bed 16) amounted to 320 grams per hour. As can be seen from the graph, the valve 6 was open for about 8% of the total operating time.

We have found that, with a flow rate upwardly through the elutriating column 3 of from 560 to 590 liters per hour the valve 6 is usually open no more than from 10 to 30% of the total operating time.

FIG. 4 diagrammatically illustrates an arrangement in which the particle size classification column is built into the side wall of an electrochemical cell. In this figure, the diameter of the elutriation column is greatest in the region of the inlet for particles from the cell. Above the inlet zone, the diameter of the column is reduced.

Figure 5:
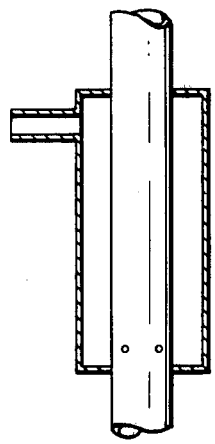

FIG. 5 shows one arrangement for introducing the elutriating fluid to the base of the elutriation column. Fluid is fed to a jacket surrounding the lower part of the column, and enters the column from the jacket via a plurality of apertures. This arrangement has been found to give an even flow distribution of the ascending fluid within the column.

Figure 6:
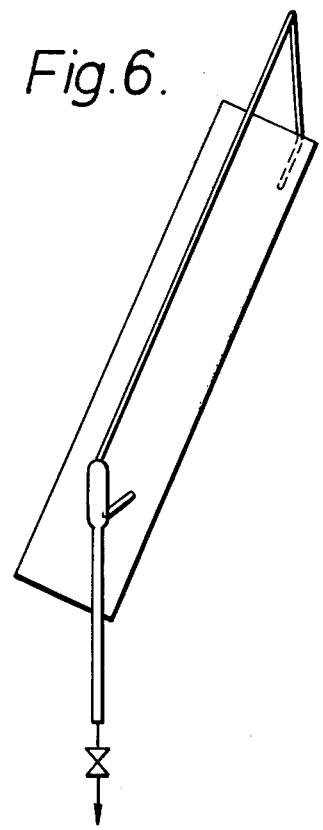

FIG. 6 illustrates an arrangement in which the elutriation column and the electrochemical cell are tilted from the vertical. This arrangement may be used, for example, in conjunction with the electrochemical processes described and claimed in our copending British Patent Applications Nos. 34077/74 and 49184/74.

The invention will be further illustrated by the following Examples.

EXAMPLE 1

In a test run lasting 100 hours an electrochemical cell having a cathode compartment having the following inside dimensions:

width: 450 mm
height: 640 mm
thickness: 35 mm and containing a particulate electrode was used to electrowin copper from a solution of copper sulphate with a deposition rate of 450 g/hr of metal. The cell was operated with a classification system similar to the apparatus shown schematically in FIG. 1 but without the pressure control devices 7 and 12.

The classification system was operated at a catholyte flow rate of 680 l/hr in order to collect a product of +890 μm at a rate of 450 g/hr.

The dimensions of the classification system are as given below:

classifier column internal diameter: 24.5 mm
total height: 2000 mm
distance from particle inlet 2 to solution inlet 10: 500 mm The conditions under which the cell and the classifying system operated were as follows:

| bed particle size | 200 to 950 | μm |
|---|---|---|
| bed height | 50 ± 2 | cm |
| particle density | 8900 | kg/m$^3$ |
| catholyte flow rate (to the cell) | 3.6 | m$^3$/h |
| solution density | 1200 | kg/m$^3$ |
| solution viscosity | 1 10$^{-3}$ | kg/m s |
| ascending solution flow-rate (to the column) | 680 | l/h |
| particle flow-rate (from the cell to the classifying system) | 40 | kg/h |
| particle volume/solution volume ratio in the column | about 1/100 | |
| classification cycle period | about 1 h | |
| value of constant K in above equation | 1.27 | |

EXAMPLE 2

In a test run lasting 10 hours, a particulate bed cell having inside dimensions:

| width | 820 | mm |
|---|---|---|
| height | 1200 | mm |
| cathode compartment thickness | 40 | mm | and electrodepositing nickel from a solution of nickel sulphate at a rate of 1200 g/hr of metal, was operated with a classification system similar to the apparatus shown schematically in FIG. 1 but without the pressure control devices 7 and 12.

The classification system was operated at a flow rate of about 420 l/hr in order to collect fully grown particles at a rate of 1200 g/hr.

The dimensions of the column are as follows:

| inside diameter | 20 | mm |
|---|---|---|
| total height | 2250 | mm |
| distance from particle inlet to solution inlet | 300 | mm |

The conditions under which the cell and the classifying system operated were as follows:

| | μm | % |
|---|---|---|
| screen analysis of bed particles | + 1190 | 3.4 |
| | − 1190  + 890 | 74.3 |
| | − 890  + 600 | 16.4 |
| | − 600  + 500 | 4.0 |
| | − 500  + 300 | 2.4 |
| bed height | 900 mm | |
| particle density | 8900 kg/m$^3$ | |
| catholyte flow-rate | 6 m$^3$/h | |
| catholyte density | 1200 kg/m$^3$ | |
| catholyte viscosity | 1.5 10$^{-3}$ kg/m s | |

With the valve 9 fully open, the flow rates of solution and particles from the cell were as follows:

| solution | 180 | l/h |
|---|---|---|
| particles | 20 | kg/h | and the collected particles had a size range of

| | + 1190 | 20% |
|---|---|---|
| − 1190 | + 890 | 80% |
| − 890 | | traces |

With the valve 9 partially closed, the results obtained were as given below:

| solution flow rate from the cell | 40 | l/hr | |
|---|---|---|---|
| particles flow rate from the cell | 72 | kg/hr | |
| size range of collected particles | | +1190 | 50% |
| | −1190 | + 890 | 50% |
| | − 890 | | traces |
| value of constant K in above equation | 1.02 | | |
| classification cycle period in this last case | 2 | hr | |

By using a method of particle size classification as described herein, it is possible to avoid the formation of very large particles (i.e. larger than 2 or 3 mm) within the particulate electrode of an electrochemical cell, a problem which tends to occur with discontinuous screening of only part of the particulate electrode. Such large particles considerably disturb the motion of particles within a fluidised electrode, and could promote the plating of metal onto an ion-permeable membrane constituting a boundary wall for the electrode compartment by remaining close to the membrane for long periods of time.

The method of the invention may be modified to provide a method of obtaining particles of a predetermined size or size range from a particulate electrode, which comprises extracting a sample of particles from the particulate electrode and subjecting the sample to elutriation, the flow rate of elutriating fluid being such that particles of the predetermined size or size range are separated from the other particles. The sample extraction may be continuous or intermittent; and two or more elutriation steps may be employed to obtain particles within a predetermined size range.

We claim:

1. A method of controlling the size distribution of electroconductive particles constituting a particulate cathode in an electrochemical cell during operation of the cell to deposit metal from solution onto the particles of the particulate cathode whereby the size of the said particles increases progressively, which method comprises extracting particles from the particulate electrode and subjecting the extracted particles to elutriation, the flow of elutriating fluid being such that particles larger than a predetermined size are able to settle against the flow of elutriating fluid, while the other particles, which are to be returned to the electrochemical cell, are carried along by the flow of elutriating fluid and are then returned to the electrochemical cell after separation from the elutriating fluid or along with the elutriating fluid.

2. A method according to claim 1, wherein an elutriation column is in communication with the bed of electroconductive particles within the electrochemical cell, and wherein extraction of particles from the cell is governed by controlling the discharge of particles from the base of the elutriation column.

3. A method according to claim 2, wherein the height of the bed of electroconductive particles within the electrochemical cell is monitored continuously by means of an electronic circuit or magnetic detector positioned so that its electronic or magnetic characteristics are affected by the electroconductive particles, and wherein discharge of the particles from the base of elutriation column is initiated whenever the electronic or magnetic characteristics of said electronic circuit or magnetic detector are of a first, predetermined type indicative of a predetermined maximum height of the bed of electroconductive particles within the electrochemical cell.

4. A method according to claim 3, wherein termination of discharge of particles from the base of the elutriation column is effected whenever the electronic or magnetic characteristics of the electronic circuit or magnetic detector are of a second, predetermined type indicative of a predetermined minimum height of the bed of electroconductive particles within the electrochemcial cell.

5. A method according to claim 1, wherein elutriation of the particles extracted from the electrochemical cell is effected in an elutriation column, and wherein the height of the bed of electroconductive particles within the electrochemical cell is monitored continuously by means of an electronic circuit or magnetic detector positioned so that its electronic or magnetic characteristics are affected by the electroconductive bed of particles, the arrangement being such that extraction of the particles from the electrochemical cell and the supply of extracted particles to the elutriation column is initiated whenever the electronic or magnetic characteristics of the electronic circuit or magnetic detector are of a first, predetermined type indicative of a predetermined maximum height of the bed of electroconductive particles within the electrochemical cell.

6. A method according to claim 5, wherein termination of the extraction of particles from the electrochemical cell is effected when ever the electronic or magnetic characteristics of the electronic circuit or magnetic detector are of a second, predetermined type indicative of a predetermined minimum height of the bed of electroconductive particles within the electrochemical cell.

7. A method according to claim 5, wherein there are employed two probes each containing an electronic circuit or magnetic detector, the probes being spaced apart from one another and being positioned so that their electronic or magnetic characteristics are affected by the electroconductive particles, the arrangement being such that extraction of particles from the electrochemical cell or from the elutriation column is initiated whenever the electronic or magnetic characteristics of one of the probes are of a predetermined type indicative of a predetermined maximum height of the bed of electroconductive particles within the electrochemical cell, and is terminated when ever the electronic or magnetic characteristics of the other probe are of a predetermined type indicative of a predetermined minimum height of the bed of electroconductive particles within the electrochemical cell.

8. A method according to claim 1, wherein the pressure at the base of the electrochemical cell is continuously monitored, and extraction of particles from the electrochemical cell or from the elutriation column is initiated whenever the pressure at the base of the electrochemical cell reaches a first, predetermined value.

9. A method according to claim 8, wherein extraction of particles from the electrochemical cell or the elutriation column is terminated whenever the pressure at the base of the electrochemical cell falls to a second, predetermined value.

10. A method according to claim 1, wherein elutriation is carried out in an elutriation column, and wherein particles extracted from the electrochemical cell are supplied to the column at a position away from its ends.

11. A method according to claim 10, wherein that region of the elutriation column which receives the particles extracted from the electrochemical cell has a diameter greater than the remaining parts of the column.

12. A method according to claim 10, wherein the elutriation column is from about 1 to about 4 meters high and wherein particles extracted from the electrochemical cell are introduced into the elutriation column at a point at least 0.3 meters above the point at which the elutriating fluid enters the column.

13. A method according to claim 10, wherein particles extracted from the electrochemical cell are caused to enter the elutriation column at an angle of inclination of at least 30° to the horizontal.

14. A method according to claim 1, wherein the elutriating fluid is electrolyte from the electrochemical cell.

15. A method according to claim 1, wherein particles extracted from the electrochemical cell are extracted from a region of turbulence within the eletroconductive bed of particles.

16. A method according to claim 1, wherein the electroconductive particles are selected from the group consisting of iron, nickel, chromium, aluminum, copper, cobalt or brass.

17. A method of controlling the size distribution of electroconductive particles constituting a particulate electrode in an electrochemical cell, which method cmprises continuously monitoring the height of the bed of electroconductive particles within the electrochemical cell by means of at least one electronic or magnetic detector positioned so that its electronic or magnetic characteristics are affected by the electroconductive particles; putting the bed of electroconductive particles into communication with an elutriation column through which an elutriating fluid is caused to flow at a flow rate such that electroconductive particles from the electrochemical cell which are larger than a predetermined size are able to settle against the flow of elutriating fluid, while the other particles, which are to be returned to the electrochemical cell, are carried along by the flow of elutriating fluid; allowing particles to discharge from the elutriation column whenever the electronic or magnetic characteristics of the or one of the electronic circuits or magnetic detectors are of a predetermined type indicative of a predetermined maximum height of the bed of electroconductive particles within the electrochemical cell; terminating discharge of particles from the elutriation column whenever the electronic or magnetic characteristics of the or one of the electronic circuits or magnetic detectors are of a predetermined type indicative of a predetermined minimum height of the bed of electroconductive particles within the electrochemical cell; and returning to the electochemical cell those particles which are carried along by the flow of elutriating fluid optionally after separation, from the elutriating fluid.

18. A method according to claim 17, wherein extraction of particles from the electrochemical cell or from the elutriation column is effected by operation of a pinch valve located in a conduit through which the particles are to pass.

19. A method according to claim 17, wherein the height of the bed of electroconductive particles within the electrochemical cell is monitored by means of an LC oscillator circuit.

* * * * *